Oct. 4, 1927.

M. R. HULL 1,644,018

CONNECTER PLATE FOR VEHICLE DOORS

Filed July 15, 1924

Inventor
Matthew R. Hull

By
Attorney

Patented Oct. 4, 1927.

1,644,018

UNITED STATES PATENT OFFICE.

MATTHEW R. HULL, OF CONNERSVILLE, INDIANA, ASSIGNOR TO REX MANUFACTURING COMPANY, OF CONNERSVILLE, INDIANA, A CORPORATION OF INDIANA.

CONNECTER PLATE FOR VEHICLE DOORS.

Application filed July 15, 1924. Serial No. 726,221.

My said invention relates to connecter plates for vehicle doors and is intended primarily for securing a demountable upper door section to a permanent lower door section of an automobile provided with a demountable top. It is an object of the invention to provide adjusting means for such connecter plates whereby the relative positions of the parts may be varied.

A further object of the invention is to provide convenient means for attachment of such connecter plates to doors of different thickness.

Figure 1:
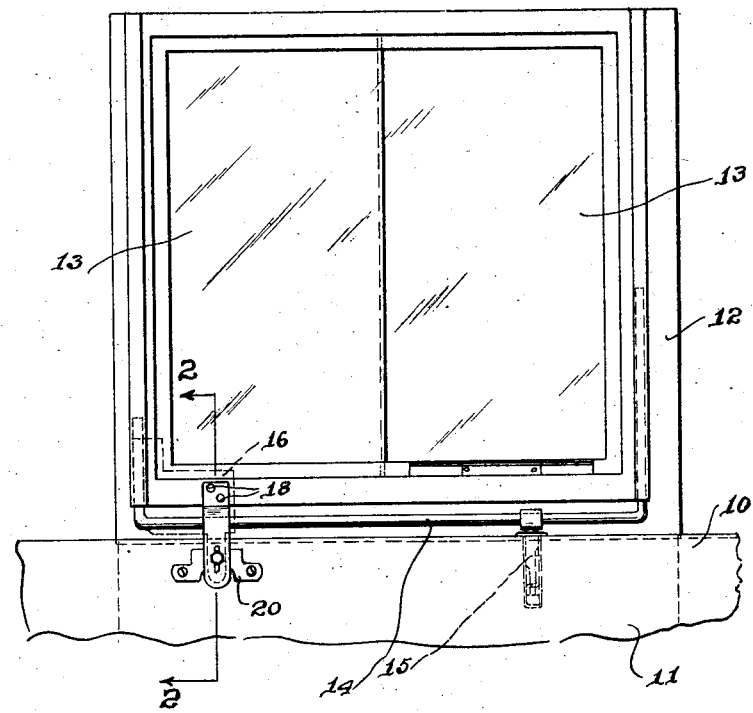
Figure 2:
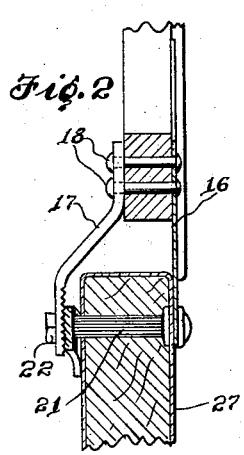
Figure 3:
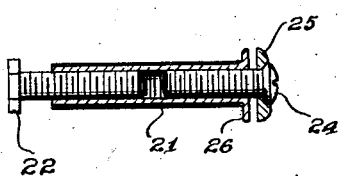
Figure 4:
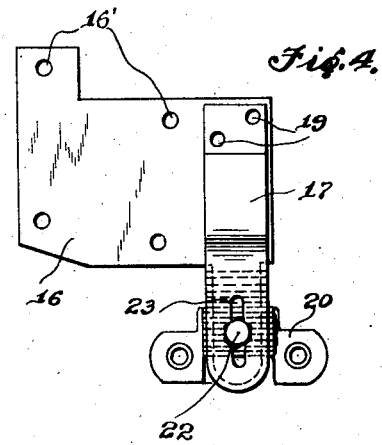

Referring to the accompanying drawings, which are made a part hereof and on which similar reference characters indicate similar parts, Figure 1 is an elevation of an automobile door with my device applied thereto, viewed from the inside of the vehicle, Figure 2, a section on line 2—2 of Figure 1, Figure 3, a detail of a part shown in Figure 2, and Figure 4 an elevation of the connecter plates detached from the door.

In the drawings reference character 10 indicates a part of an automobile body having a swinging permanent door 11 which is surmounted by a demountable upper door section 12 when the demountable top is applied to the vehicle. The door has transparent panels of glass 13 as usual and is provided with a resilient connecter 14 on which is mounted a ferrule pin 15 said devices not forming part of the invention herein claimed. Adjacent the rear lower corner of the demountable section a more or less flexible metallic plate 16 is secured to the door at the outside, said plate being, of course, covered by the outer trim of the door. The plate 16 is of irregular shape as shown in Figure 4 and has holes 16' as for attachment of the plate by means of rivets or screws. At the inner side of the door an angular plate 17 is attached to the demountable door by means of rivets 18 passing through registering holes in the plates 16 and 17 such holes being indicated at 19 in Figure 4.

The plate 17 has parallel upper and lower end portions and is bent at its middle portion so as to fit over the permanent lower door section which is usually thicker than the upper door section. At its lower end the plate is corrugated on one side for co-operation with corrugations on the flat body of a flat bar 20 permanently secured to the lower section in any convenient manner. A longitudinally corrugated housing 21 is driven into a hole in the lower door section and preferably bears against the inner side of the bar 20. A screw 22 extends through the registering openings in the plate 17 and bar 20 and engages internal threads in the housing 21 for securing the plates rigidly and adjustably together, the corrugations serving to hold them securely in adjusted position and a slot 23 in plate 17 providing means for adjustment to locate the demountable section properly with respect to the permanent section.

For securing the plate 16 to the lower door section, a screw 24 has threads engaging threads in the housing 21 said screw having a head fitting into a countersunk washer 25 which rests against the plate 16, the housing 21 having a flange or head at 26 which bears against the sheet-metal trim 27 of the door thereby holding the housing in place. At the other side of the door the housing extends through the trim and bears against the inner side of the bar 20 as heretofore described.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention what I claim as new and desire to secure by Letters Patent, is:

1. A fastening for attaching an upper demountable section to the lower permanent section of an automobile door comprising in combination an outer flat plate, an inner plate offset to conform to any difference of thickness in the two sections, the inner plate having corrugations at its lower end, a corrugated bar mounted underneath the corrugated end, means for adjustably holding the corrugated members together with the outer flat plate held in a sprung position, substantially as set forth.

2. Means for securing an upper demountable door section to a lower permanent door section comprising inner and outer plates permanently secured to the upper door section, means for securing the outer plate in permanent relation to the lower door section, and a screw passing through the lower portion of the inner plate for securing it to the lower door section the inner plate being corrugated at its lower end for selective engagement with corrugations on the lower door section, substantially as set forth.

3. Means for securing a demountable door section to a permanent door section comprising inner and outer plates permanently secured to one door section, a housing extending through the lower door section, a plate resting against the inner end of said housing said plate having corrugations matching with corrugations on the inner one of said first named plates, and fastening means cooperating with said housing to secure the lower ends of the inner and outer plates to the lower door, substantially as set forth.

4. Means for securing a demountable door section to a permanent door section comprising inner and outer plates permanently secured to one door section, a longitudinally corrugated housing secured in the other door section and alined screws having threaded engagement with the housing said screws extending through the inner and outer plates respectively, substantially as set forth.

5. Means for securing a demountable door section to a permanent door section comprising inner and outer plates permanently secured to one door section, a housing having one end extending through the trim of the other door section and its other end flanged to rest against the trim, and screws having threaded engagement with the housing said screws extending respectively through the inner and outer plates, substantially as set forth.

6. Means for connecting an upper demountable section to a permanent lower section of an automobile door comprising a plate secured to the upper door section at one side of the door, a bar secured to the lower door section at the same side of the door said plate and bar having corresponding corrugations and one of said corrugated members having a vertically elongated slot, a screw passing through said slot into the other member to secure said plate and bar together in adjusted relation, and means at the other side of the door for holding said sections in permanent spaced relation, substantially as set forth.

7. In a two-part vehicle door a lower section, a demountable upper section, inner and outer plates attached to the demountable section at the lower end adjacent to the hinge side, screws extending through said lower door section and said plates in line with each other, a threaded sleeve connecting said screws, the inner one of said plates having corrugations, and a secondary plate between said corrugated plate and the adjacent end of said sleeve said secondary plate having corrugations matching those of the first, substantially as set forth.

In witness whereof, I have hereunto set my hand at Connersville, Indiana this 30th day of June, A. D. nineteen hundred and twenty-four.

MATTHEW R. HULL.